(12) United States Patent
King et al.

(10) Patent No.: US 7,962,649 B2
(45) Date of Patent: Jun. 14, 2011

(54) MODEM PRIORITIZATION AND REGISTRATION

(75) Inventors: Patrick S. King, Stow, MA (US); Cong Shen, Northborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 878 days.

(21) Appl. No.: 11/973,268

(22) Filed: Oct. 5, 2007

(65) Prior Publication Data

US 2009/0094381 A1 Apr. 9, 2009

(51) Int. Cl.
*G06F 15/173* (2006.01)

(52) U.S. Cl. .................... 709/240; 709/226; 709/238

(58) Field of Classification Search .............. 709/203, 709/223, 226, 227, 229, 249, 238, 240
See application file for complete search history.

(56) References Cited

U.S. PATENT DOCUMENTS

| | | | |
|---|---|---|---|
| 5,812,534 A * | 9/1998 | Davis et al. ............ | 370/260 |
| 6,216,171 B1 | 4/2001 | Isono et al. | |
| 6,282,208 B1 | 8/2001 | Bowcutt et al. | |
| 6,374,295 B2 * | 4/2002 | Farrow et al. ........... | 709/223 |
| 6,427,170 B1 * | 7/2002 | Sitaraman et al. ....... | 709/226 |
| 6,564,216 B2 * | 5/2003 | Waters ................. | 1/1 |
| 6,577,628 B1 * | 6/2003 | Hejza .................. | 370/392 |
| 6,611,859 B1 * | 8/2003 | Kohno ................. | 709/203 |
| 6,725,047 B1 * | 4/2004 | Farley et al. ........... | 455/456.3 |
| 7,016,324 B2 * | 3/2006 | Agrawal et al. ......... | 370/331 |
| 2001/0030977 A1 * | 10/2001 | May .................... | 370/475 |
| 2003/0076805 A1 * | 4/2003 | Agrawal et al. ......... | 370/338 |
| 2004/0136379 A1 | 7/2004 | Liao et al. | |
| 2004/0177133 A1 * | 9/2004 | Harrison et al. ......... | 709/220 |
| 2004/0181812 A1 | 9/2004 | Briggs | |

OTHER PUBLICATIONS

PCT International Search Report and Written Opinion of the International Searching Authority having a date of mailing of Dec. 5, 2008 in co-pending PCT International Patent Application No. PCT/US08/78554, International Filing Date of Oct. 2, 2008 and entitled "Modem Prioritization and Registration".

* cited by examiner

*Primary Examiner* — Faruk Hamza
(74) *Attorney, Agent, or Firm* — Patterson & Sheridan, LLP

(57) ABSTRACT

In one embodiment, a flow control logic facilitates controlling modem prioritization and registration. The flow control logic controls an order in which stored DHCP requests are provided to a DHCP server. The DHCP requests may be stored in a plurality of groups in a data store. DHCP requests may be distinguishable based, at least in part, on priorities associated with cable modems from which DHCP requests are received. The priority may be determined by a value in the DHCP request. The flow control logic may control the rate and order at which stored DHCP requests are provided to the DHCP server.

20 Claims, 7 Drawing Sheets

MODEM PRIORITIZATION AND REGISTRATION

TECHNICAL FIELD

This disclosure relates generally to modem prioritization and registration. More specifically, the disclosure relates to controlling the flow of Dynamic Host Configuration Protocol (DHCP) requests from cable modems to a DHCP server to facilitate modem prioritization and registration.

BACKGROUND

A cable modem (CM) provides access to a signal sent over a cable television (CATV) system. The signal may be associated with a network (e.g., the Internet) to which the CATV provides access. The signal may be, for example, an electrical signal, an optical signal, an analog signal, a digital signal, data, and so on. A cable modem may need to acquire an Internet Protocol (IP) address to access the network. DHCP servers provide IP addresses. Therefore, a CM may send a DHCP request to a DHCP server and a DHCP server may send a reply to a CM requesting an IP address. These DHCP requests and replies may traverse a cable modem termination system (CMTS) associated with the CATV. While a cable modem may communicate with a single CMTS, the CMTS may communicate with a large set (e.g., thousands, tens of thousands) of modems. Additionally, the CMTS may communicate with a set of DHCP servers involved in initializing modems. Thus, a CMTS and/or a DHCP server may produce a choke point associated with processing DHCP requests from modems. This choke point may produce delays in the modem registration process.

Before a cable modem can communicate through a CMTS, the cable modem may need to initialize and register with the CMTS. Initialization and registration may involve progressing the cable modem through states including channel scanning, contention ranging, secondary ranging, DHCP, and so on. These states and communications between the cable modem and the CMTS associated with these states may conform to a data over cable service interface specification (DOCSIS (e.g., DOCSIS 3.0, August 2006)). Conventionally, initialization and registration of a set of cable modems in accordance with the DOCSIS may produce a bottleneck in the CMTS. The bottleneck may be related to a mismatch in the rate at which a CMTS can bring cable modems to the DHCP state and the rate at which a CMTS and/or DHCP server can process DHCP requests to advance a cable modem past the DHCP state. In some cases, an additional bottleneck may occur in a CMTS and/or DHCP server when a DHCP request arrival rate exceeds a DHCP request processing rate. The bottleneck(s) may limit the rate at which cable modems are registered and brought online. The bottleneck(s) may affect all cable modems equally, even though it may be desirable to have some cable modems registered before other cable modems. For example, some cable modems may be associated with high priority entities (e.g., 911 service, high rate subscriber) while other cable modems may be associated with low priority entities (e.g., advertising kiosk, low rate subscriber).

BRIEF DESCRIPTION OF THE DRAWINGS

In the accompanying drawings, which illustrate various embodiments, it will be appreciated that the element boundaries (e.g., boxes, groups of boxes, or other shapes) are representative and not limiting. One of ordinary skill in the art will appreciate that in some embodiments one element may be designed as multiple elements, multiple elements may be designed as one element, an element shown as an internal component of another element may be implemented as an external component and vice versa, and so on. Furthermore, elements may not be drawn to scale.

DESCRIPTION OF EXAMPLE EMBODIMENTS

Overview

This application describes example apparatus and methods for controlling the flow of DHCP requests from cable modems to DHCP servers to facilitate modem prioritization and registration. The DHCP requests may be tasked with acquiring Internet Protocol (IP) addresses from a DHCP server. One example apparatus includes a data store for storing DHCP requests in priority groups organized by cable modem priorities. The example apparatus includes a flow control logic to control the order in which stored DHCP requests are provided to a DHCP server. The order may be based, at least in part, on the priorities of the cable modems providing the DHCP requests. The priorities may be identifiable by attributes of a DHCP request. Therefore, the example apparatus may include a prioritizer to parse incoming requests and to identify and/or assign a priority to a request. DHCP requests may be described by different DHCP standards (e.g., RFC 2131 March 3007, RFC 3315 July 2003). Similarly, the IP addresses may conform to an IP standard (e.g., IPv4 RFC-791, Ipv6 RFC2460).

References to "one embodiment", "an embodiment", "one example", "an example embodiment", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment, though it may.

Figure 1:
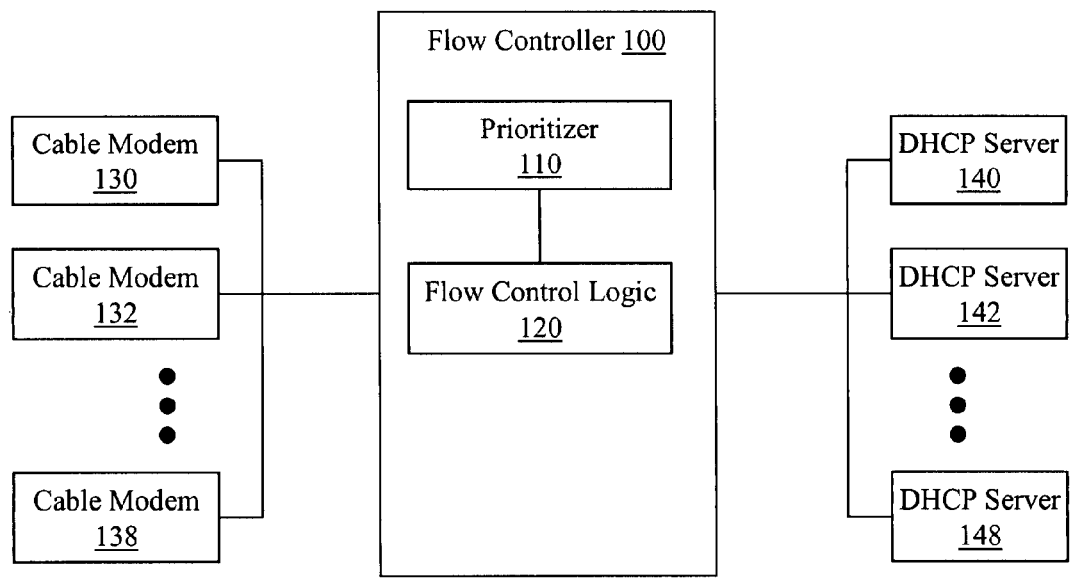
FIG. 1 illustrates an example apparatus associated with modem prioritization and registration.

FIG. 1 illustrates an embodiment of a flow controller 100. The flow controller 100 controls the flow of DHCP requests from cable modems to DHCP servers to facilitate controlling modem prioritization and registration. The flow controller 100 may receive DHCP requests from a set of cable modems (e.g., cable modem 130 and cable modems 132 through 138) that are attempting to come online. Rather than passing the DHCP requests to a DHCP server(s) in a received order, the flow controller 100 may control the order in which the DHCP requests are sent based on priorities determined for the DHCP requests and/or cable modems. For example, the flow controller 100 may parse a DHCP request to gather information about a cable modem that sent the DHCP request. Parsing DHCP requests may include, for example, examining the requests syntactically, examining the requests semantically, examining values in the requests, identifying characteristics, and so on.

Using information from a DHCP request, the flow controller 100 can determine if a DHCP request should be processed with a higher or lower priority. In one example, a selected characteristic(s) can be pre-designated as a priority characteristic(s). If the information from a parsed DHCP request includes a priority characteristic, then the DCHP request will be given a higher priority. In one example, a characteristic in a DHCP request may identify the request as coming from a cable modem having Voice Over IP (VOIP) capabilities. This request may be treated as high priority. A characteristic in another DHCP request may identify the request as coming from a cable modem having data-only capabilities. This request may be treated as low priority. It is to be appreciated that information parsed from a DHCP request may be referred to as "priority information" since the information is used to determine a priority for a request that may affect the order in which the request is processed.

The flow controller 100 may control the order in which DHCP requests are provided to a set of DHCP servers (e.g., DHCP server 140 and DHCP servers 142 through 148). While a set of DHCP servers is illustrated, it is to be appreciated that the flow controller 100 may provide DHCP requests to a single DHCP server. In one example, the flow controller 100 may include a prioritizer 110 that parses DHCP requests to identify a cable modem characteristic(s) and that assigns priorities to DHCP requests based on the identified cable modem characteristic. In the example, the flow controller 100 may also include a flow control logic 120 that controls the order in which DHCP requests are provided to a DHCP server, where the order is priority based.

Figure 2:
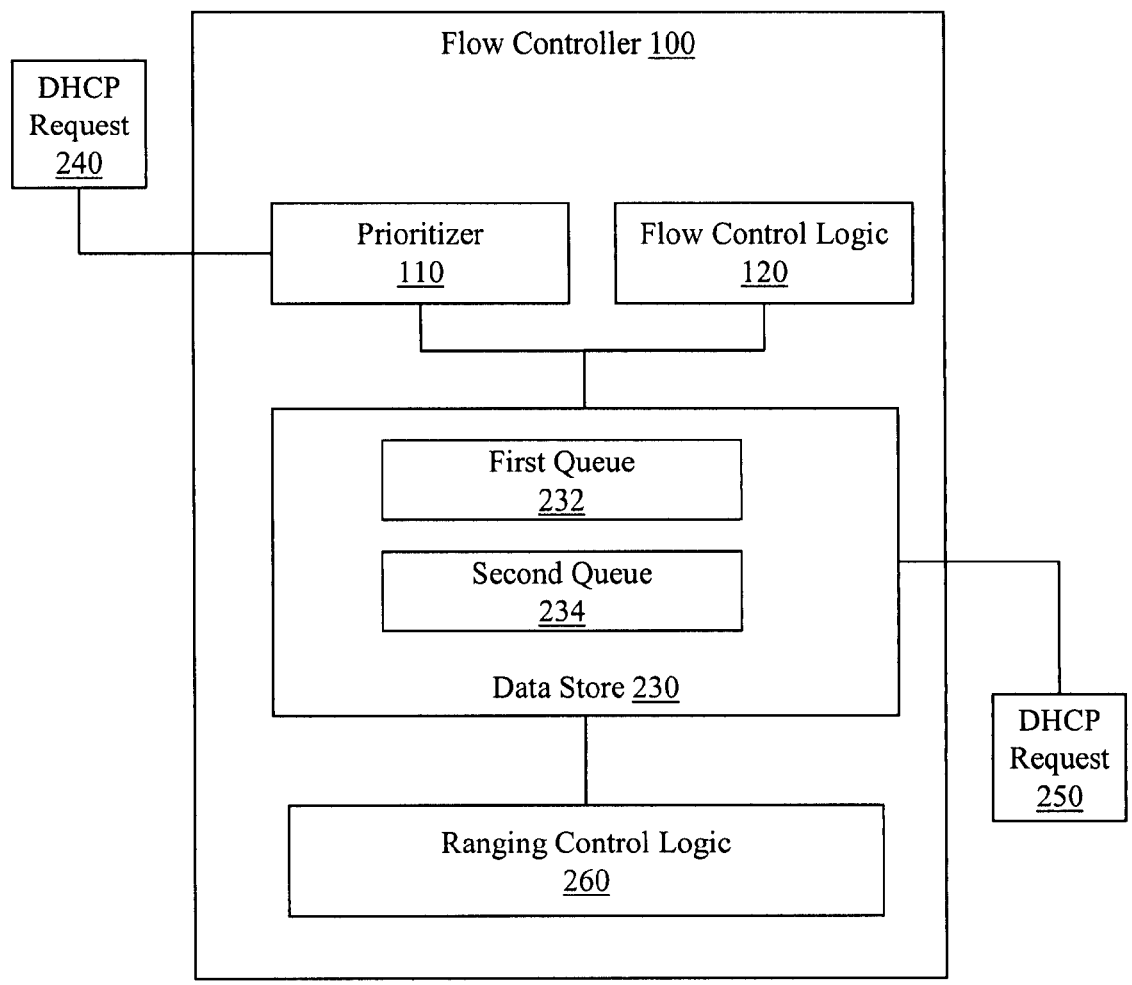
FIG. 2 illustrates an example apparatus associated with modem prioritization and registration.

FIG. 2 illustrates an example of the flow controller 100 that includes a data store 230. Controlling the order in which DHCP requests are provided to a DHCP server may include storing DHCP requests in the data store 230 so that requests from higher priority cable modems can be processed and provided to a DHCP server before requests from lower priority cable modems. DHCP requests may be stored in different priority groups in the data store 230. Thus the data store 230 may include a first queue 232 and a second queue 234 to store requests in the different priority groups. The data store 230 may be a physical and/or logical entity that can store data. The data store 230 may be, for example, a table, a file, a list, a queue, a memory, and so on. In different examples a data store may reside in one logical and/or physical entity and/or may be distributed between multiple logical and/or physical entities.

The different priority groups may correspond to priorities associated with cable modems. A first priority group can be associated with high priority requests and a second priority group can be associated with low priority groups. While two priority groups and two queues are described, it is to be appreciated that a greater number of priority groups and/or queues may be employed. The number of priority groups and/or queues may depend, for example, on the requirements of a given application. Thus, the flow controller 100 can be configured to control the flow and order of requests by transmitting DHCP requests stored in the first priority group to the DHCP server before transmitting DHCP requests stored in the second priority group. It is to be appreciated that the flow controller 100 can be made to operate using a priority schedule for selecting and transmitting DHCP requests from the priority groups. The priority schedule is described in more detail below.

In one embodiment, the flow controller 100 may determine where to store a DHCP request (e.g., DHCP discover request) based on whether information parsed from the DHCP request matches a priority characteristic. The priority characteristic may be pre-designated and/or may be modifiable based on how the flow controller 100 is configured to operate. The priority characteristic may be associated with cable modem capabilities. For example, cable modems that have voice over IP (VOIP) capabilities may be assigned a higher priority than cable modems that have data only capabilities. In another example, a priority characteristic may be based on a subscription rate paid by a cable modem user and/or on an application supported by the cable modem (e.g., 911 services). In another example, the priority characteristic may be based on a service identifier field (SID) that may be a unique identifier for a cable modem. The SID may be assigned by a CMTS during cable modem registration. Accordingly, when a DHCP request is determined to be associated with or include a priority characteristic, the flow controller 100 can change the order in which the request is processed. While three priority examples are provided and a SID example is described, it is to be appreciated that other priority characteristics based on other request fields may be employed.

The flow control logic 120 may provide DHCP requests from the first queue 232 and the second queue 234 in an order controlled by a priority schedule. The priority schedule facilitates controlling the order in which cable modems initialize and register by controlling DHCP request forwarding to a DHCP server. The DHCP server provides a reply to progress a cable modem to another state. This facilitates giving some cable modems a higher priority than others. While a first queue 232 and a second queue 234 are described, it is to be appreciated that other data structures and organizations may be employed in data store 230.

Flow controller 100 facilitates controlling how cable modems with different priorities progress through initialization at different rates. Thus, flow controller 100 may include a flow control logic 120 to prioritize the order in which cable modems progress through initialization. A logic may perform a function(s) or an action(s), and/or cause a function or action from another logic, method, apparatus, system, and so on. Flow control logic 120 may prioritize cable modem initialization order by controlling the order in which DHCP requests stored in the data store 230 are provided to a DHCP server. Controlling this order in effect also controls when a reply may be provided to advance a cable modem to a later initialization state.

Another factor that may be considered in controlling the flow of DHCP requests is that a DHCP server may have an optimal frequency for receiving and processing DHCP requests. Thus, in one embodiment, the flow control logic 120 may control a rate at which stored DHCP requests are provided to a DHCP server. The rate may be based, at least in part, on a DHCP request processing time associated with the DHCP server. The frequency at which a DHCP server may receive, process, and respond to DHCP requests may vary. Information concerning the DHCP server may be input to flow controller 100 and/or may be observed over time by flow controller 100 by collecting data about communications with a DHCP server. Therefore, in one embodiment, the rate at which stored DHCP requests may be provided to the DHCP server may be user configurable and/or dynamically updateable based on information about the varying frequency.

A DHCP request 240 may be received by the flow controller 100. The request 240 may then be examined (e.g., parsed) and stored in either the first queue 232 or the second queue 234. The first queue 232 or the second queue 234 may be selected based on the priority associated with the DHCP request 240. In one example, the first priority may be associated with cable modems supporting voice communications (e.g., VOIP (voice over IP)) and the second priority may be associated with cable modems supporting data-only communications.

The flow controller 100 may receive DHCP requests from cable modems having different priorities. The flow controller 100 may be configured to prioritize certain cable modems (e.g., VOIP, gold subscriber) over other cable modems (e.g., data-only, silver subscriber). However, the flow controller 100 may not want to delay registration of all lower priority cable modems. Therefore, the flow controller 100 may examine the number of DHCP requests stored in the different queues and select a DHCP request 250 to provide to a DHCP server based on a priority schedule. In one embodiment, the priority schedule may control the flow control logic 110 to provide a DHCP request from the second queue 234 upon determining that the first queue 232 is empty. In another embodiment, the priority schedule may control the flow control logic 110 to provide M DHCP requests from the second queue 234 for each N DHCP requests provided from the first queue 232 (M & N being numbers). In one example, M and/or N may be user-configurable. In one example, M and/or N may be automatically dynamically updateable numbers. The updating may be based on an understanding of the mix of DHCP requests received from different cable modems. While two priority schedule examples are provided, it is to be appreciated that different priority schedules may be employed.

The data store 230 may have finite resources (e.g., memory). Thus, in one embodiment, the flow control logic 120 may dynamically adjust the size of the first queue 232 and/or the second queue 234 to intelligently distribute the finite resources. The size updating may be based on the DHCP server processing rate and/or on the CMPS DHCP request processing rate. The data store 230 may be made large enough to hold enough DHCP requests per time interval to match the DHCP processing rate. The size updating may, additionally and/or alternatively, be based on a ratio of DHCP requests received from cable modems having different priorities. For example, if DHCP requests are received from a substantially equivalent number of high priority cable modems and low priority cable modems then the queue sizes may be equalized. In another example, if DHCP requests are received from substantially more high priority cable modems than from low priority cable modems, then the size of the second queue 234 may be increased while the size of the first queue 232 may be reduced.

In one example, the flow controller 100 may also dynamically adjust the priority schedule. The priority schedule may be dynamically updated based, for example, on a ratio of DHCP requests received from cable modems having the first priority and DHCP requests received from cable modems having the second priority. If the number of requests from high priority cable modems greatly exceeds the number of requests from low priority cable modems, the priority schedule may be more heavily weighted to high priority cable modems. Conversely, if the number of requests from low priority modems greatly exceeds the number of requests from high priority modems the priority schedule may be reconfigured to provide additional opportunities for low priority modems. In one embodiment, the priority schedule may be user-configurable and/or dynamically updateable.

Initializing a cable modem may include progressing the cable modem through several states. A cable modem may generate a DHCP discover request associated with reaching a DHCP state. A reply from a DHCP server may advance the cable modem to a later state. A contention ranging state precedes the DHCP state. Non-contention ranging may occur after the DHCP state. Thus, one way to control the flow of DHCP requests is to control how and/or when cable modems leave the ranging state and enter the DHCP state. Another way to control the flow of DHCP requests is to prevent a modem from regressing to an earlier state (e.g., ranging) that may produce traffic and/or signals that negatively impact the initialization of other cable modems. Ranging refers to the process of automatically adjusting cable modem transmit levels and cable modem timing offsets to facilitate having cable modem bursts received at a CMTS at an appropriate time and at an appropriate power level. Ranging may involve transmitting a first ranging message at a first power level in a first contention ranging slot. Ranging may involve waiting for an acknowledgement to the first ranging message and transmitting second ranging messages at second power levels in second contention ranging slots until an acknowledgement is received. Cable modem initiated ranging may be contention based while CMTS initiated ranging may be time division multiplexing based. Contention based ranging may produce collisions that slow down cable modem initialization. Ranging may produce a volume of traffic on paths between cable modems and cable modem termination systems. Reducing this traffic can improve relations between cable modems and cable modem termination systems during initialization and registration.

With continued reference to FIG. 2, the flow controller 100 may include a ranging control logic 260 to hold a cable modem in a non-contention ranging state. In one example, the ranging control logic 260 may hold the modem in non-contention ranging when the priority queues 232 and 234 are full. In another example, the ranging control logic 260 may hold a cable modem in non-contention ranging when a DHCP request has been put in a queue (e.g., 232, 234) and then aged out while DHCP requests associated with higher priority modems were forwarded. The first example may arise when there are a number of modems coming online and the DHCP request received from modems in the different priorities exceeds the DHCP processing rate. This may cause priority queues to fill completely. The second example may arise when a higher priority cable modem has entered a DHCP state and has requested an IP address and a lower priority cable modem has completed contention ranging but has not entered a DHCP state. Rather than have the lower priority cable modem fall back to contention ranging or even to an earlier state (e.g., channel scanning), ranging control logic 260 may hold the low priority cable modem in non-contention ranging while the DHCP request for the higher priority cable modem is handled. Holding a low priority cable modem in non-contention ranging facilitates reducing contention traffic between cable modems and the flow controller 100. Traffic may be reduced because maintaining a cable modem in non-contention ranging prevents the cable modem from returning to an earlier state and retransmitting traffic associated with progressing from that earlier state to non-contention ranging. Reducing retransmissions facilitates reducing collisions and thus makes it less likely that communications associated with initializing higher priority cable modems will be negatively impacted by traffic associated with lower priority cable modems.

In one embodiment, the ranging control logic 260 may hold a cable modem in a non-contention ranging state by periodically providing ranging opportunities to the cable modem. The ranging control logic 260 may also hold a higher priority cable modem in a DHCP state for a pre-defined period of time during which it is expected that a DHCP server will provide an IP address. This facilitates preventing a cable modem from falling back from DHCP state to an earlier state (e.g., contention ranging, channel scanning). Once again, maintaining a cable modem at a later initialization state (e.g., DHCP) facilitates reducing traffic associated with progressing through initialization states.

The flow controller 100 may be embodied in different apparatus. In one example, the flow controller 100 may be integrated into a cable modem termination system (CMTS). In another embodiment, the flow controller 100 may reside in an apparatus that is operably connected to but distinct from a CMTS. An "operable connection", or a connection by which entities may be "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly through one or more intermediate entities (e.g., processor, operating system, logic, software). Logical and/or physical communication channels can be used to create an operable connection.

Figure 3:
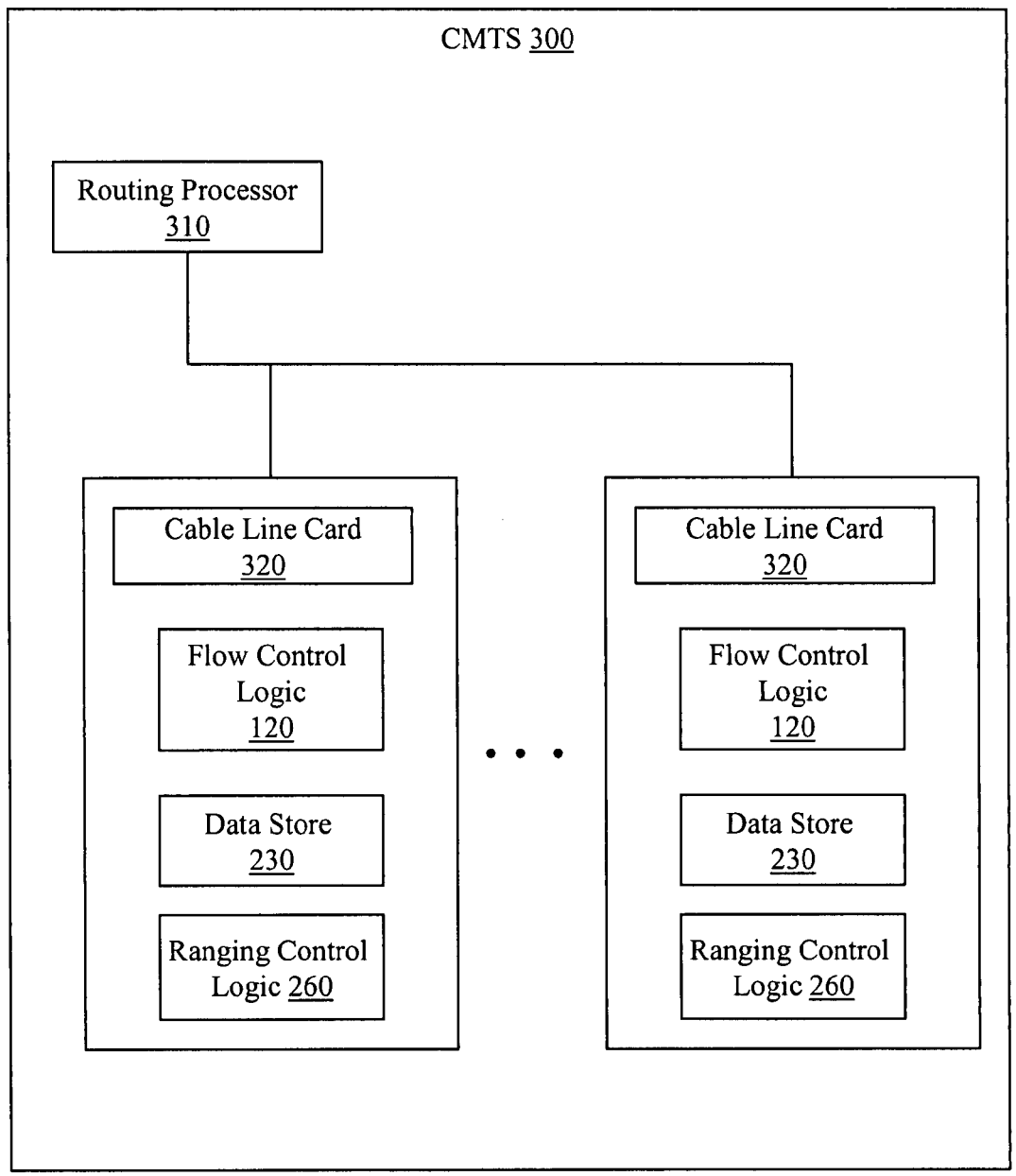
FIG. 3 illustrates an example apparatus associated with modem prioritization and registration.

FIG. 3 illustrates a cable modem termination system (CMTS) 300 into which flow control has been added. The flow control may be provided by a routing processor 310 and a set of cable line cards 320. The routing processor 310 may handle multiple cable line cards 320. The routing processor 310 may acquire statistics from a cable line card 320 concerning the number of modems per priority that have sent a DHCP request. The routing processor 310 may use these statistics to calculate a target rate per modem priority for a later time interval. The routing processor 310 may provide the calculated target rate to the cable line cards 320 to facilitate setting the target rates for the later time interval in the cable line cards 320. A cable line card 320 may include a flow control logic 120, a data store 230, and a ranging control logic 260. As described above in connection with FIG. 2, flow control may be added to a CMTS (e.g., CMTS 300) and/or may be provided by a separate apparatus to which a CMTS is operably connected.

Figure 4:
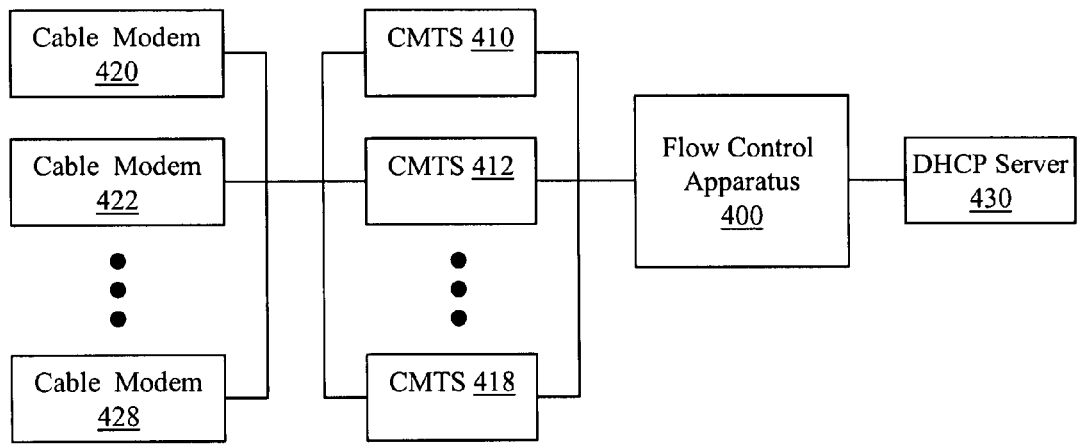
FIG. 4 illustrates an example apparatus associated with modem prioritization and registration.

FIG. 4 illustrates an embodiment of a flow control apparatus 400 associated with controlling the flow of DHCP requests. The flow control apparatus 400 may receive DHCP requests from a set of cable modem termination systems (e.g., CMTS 410 and CMTS 412 through 418). The set of cable modem termination systems may receive DHCP requests from a set of cable modems (e.g., cable modem 420 and cable modems 422 through 428). The flow control apparatus 400 may provide DHCP requests to a DHCP server 430 and provide DHCP replies received from the DHCP server 430 back to the set of cable modems through the set of cable modem termination systems.

To prioritize the order in which cable modems may initialize, the flow control apparatus 400 may include hardware, software, and/or firmware for determining the priority of a cable modem from which a DHCP discover request is received. The flow control apparatus 400 may also include memory and/or data structures for storing a set of received DHCP discover requests that are organized by priority. By storing DHCP requests, the flow control apparatus 400 has an opportunity to make decisions about the order in which DHCP requests will be forwarded to DHCP server 430. Thus, the flow control apparatus 400 may also include hardware, software, and/or firmware for controlling the order of stored DHCP discover requests provided to the DHCP server 430. The order may be based, at least in part, on the priority of cable modems sending the DHCP discover requests. The flow control apparatus 400 may also include hardware, software, and/or firmware for controlling the rate at which stored DHCP discover requests are provided to DHCP server 430. The flow control apparatus 400 is an example embodiment that is not integrated into a CMTS.

Figure 5:
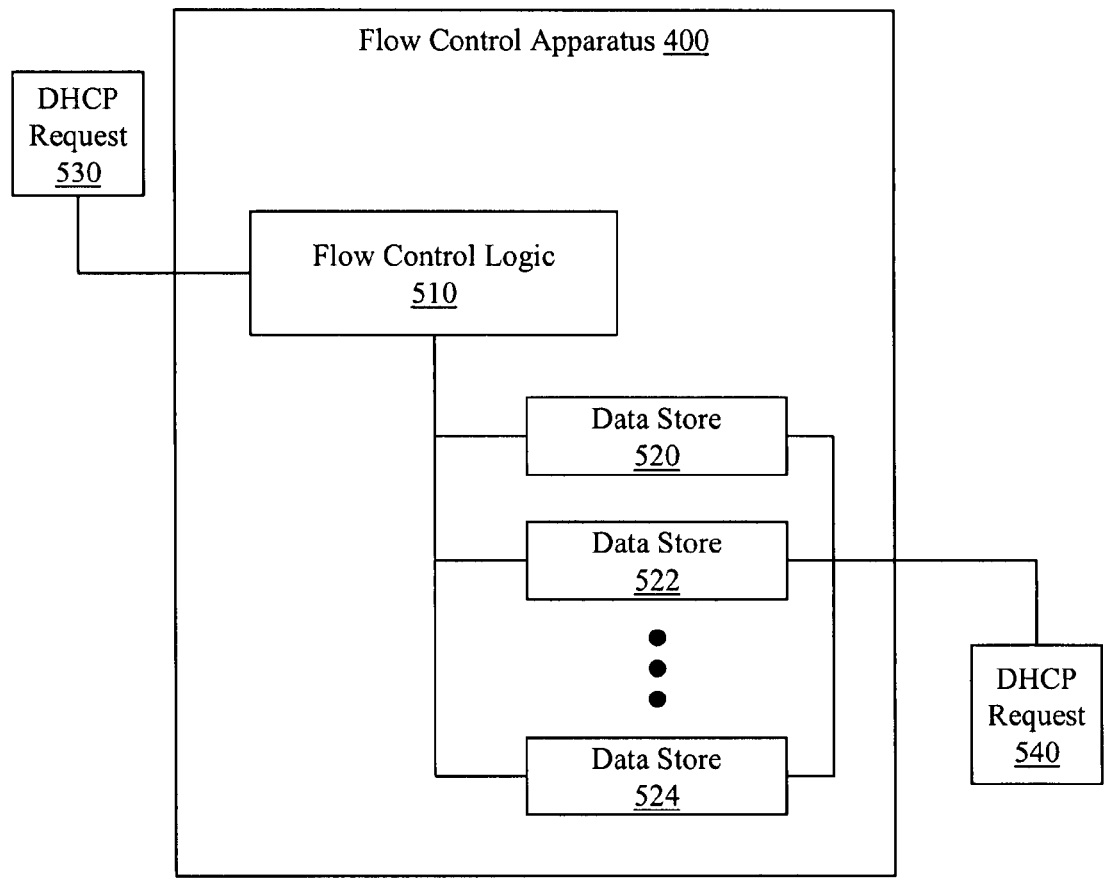
FIG. 5 illustrates an example apparatus associated with modem prioritization and registration.

FIG. 5 illustrates another example embodiment of the flow control apparatus 400. In this embodiment, the flow control apparatus 400 may include a plurality of data stores (e.g., data store 520 and data stores 522 through 524) and a flow control logic 510. The plurality of data stores may be associated with a plurality of different priority levels for cable modems. The flow control logic 510 may receive a DHCP request 530, identify a priority level of a cable modem that sent the DHCP request 530, and store the request 530 in one of the plurality of data stores. To prioritize the order in which DHCP requests are processed for different cable modems, the flow control logic 510 may then select and provide a DHCP request 540 from one of the plurality of data stores. The order may be prioritized by selecting higher priority requests before lower priority requests. The selected DHCP request 540 may then be provided to a DHCP server.

Example methods may be better appreciated with reference to flow diagrams. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

Some portions of the method embodiments that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, determining, and so on, refer to actions and processes of a computer system, logic, processor, or other electronic device that manipulates and transforms data represented as physical (electric, electronic, magnetic) quantities.

Figure 6:
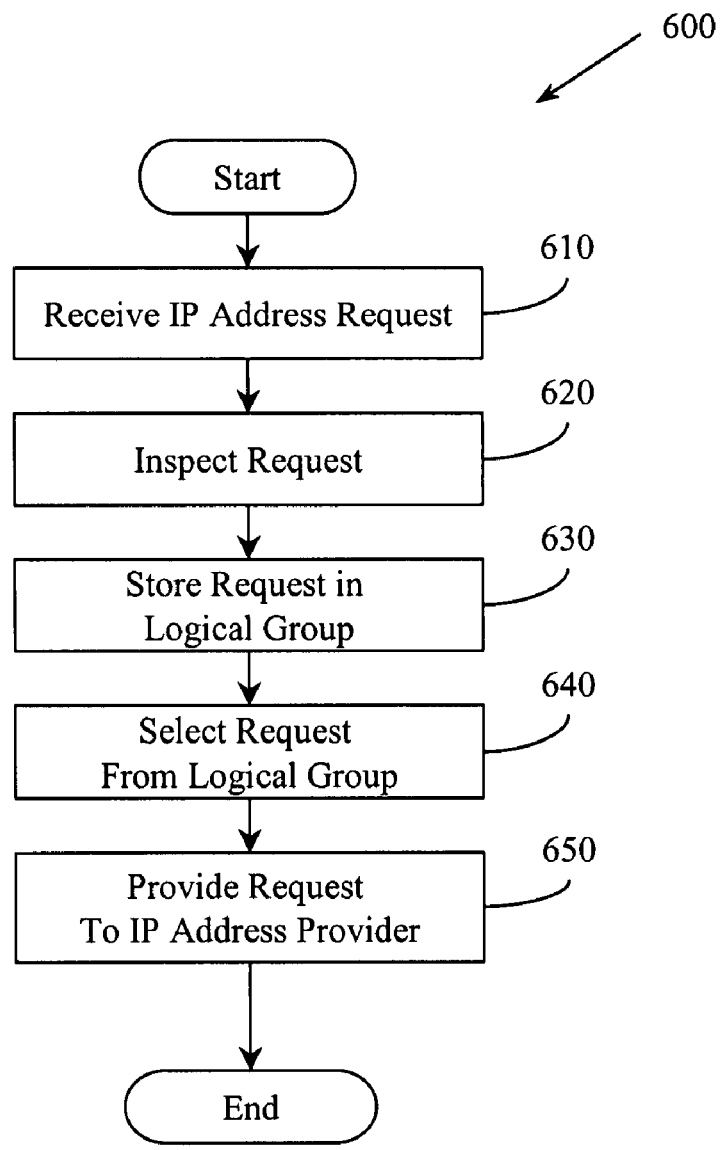
FIG. 6 illustrates an example method associated with modem prioritization and registration.

FIG. 6 illustrates an example method 600 associated with controlling the flow of DHCP requests. Method 600 may include, at 610, receiving a request for an IP address from a cable modem. The request may include information (e.g., values) for determining a characteristic of the sending cable modem. Thus, method 600 may include, at 620, inspecting the request to determine a characteristic of the cable modem. The characteristic may be, for example, a priority associated with a cable modem. Thus, in one example, priority may be determined by a priority code established in a cable modem and communicated to a flow control apparatus while in another example priority may be determined by a flow control apparatus interpretation of information available in a request.

Method 600 may also include, at 630, storing the request in one of a plurality of logical groups. The logical group to store the request may be determined, at least in part, by the characteristic. Storing a request in one of the plurality of logical groups facilitates providing requests to an IP address provider in a different order than they were received. This different order facilitates prioritizing different cable modems with respect to IP address provisioning. Therefore, method 600 may also include, at 640, selecting a request to provide to an IP address provider. The request may be selected from one of the logical groups based, at least in part, on a group provision ratio. The group provision ratio may be configured to control the order in which cable modems initialize and become available. Method 600 may conclude, at 650, by providing the selected request to an IP address provider.

While FIG. 6 illustrates various actions occurring in serial, it is to be appreciated that various actions illustrated in FIG. 6 could occur substantially in parallel. By way of illustration, a first process could receive and inspect requests, a second process could store requests, and a third process could select and provide requests. While three processes are described, it is to be appreciated that a greater and/or lesser number of processes could be employed and that lightweight processes, regular processes, threads, and other approaches could be employed.

Figure 7:
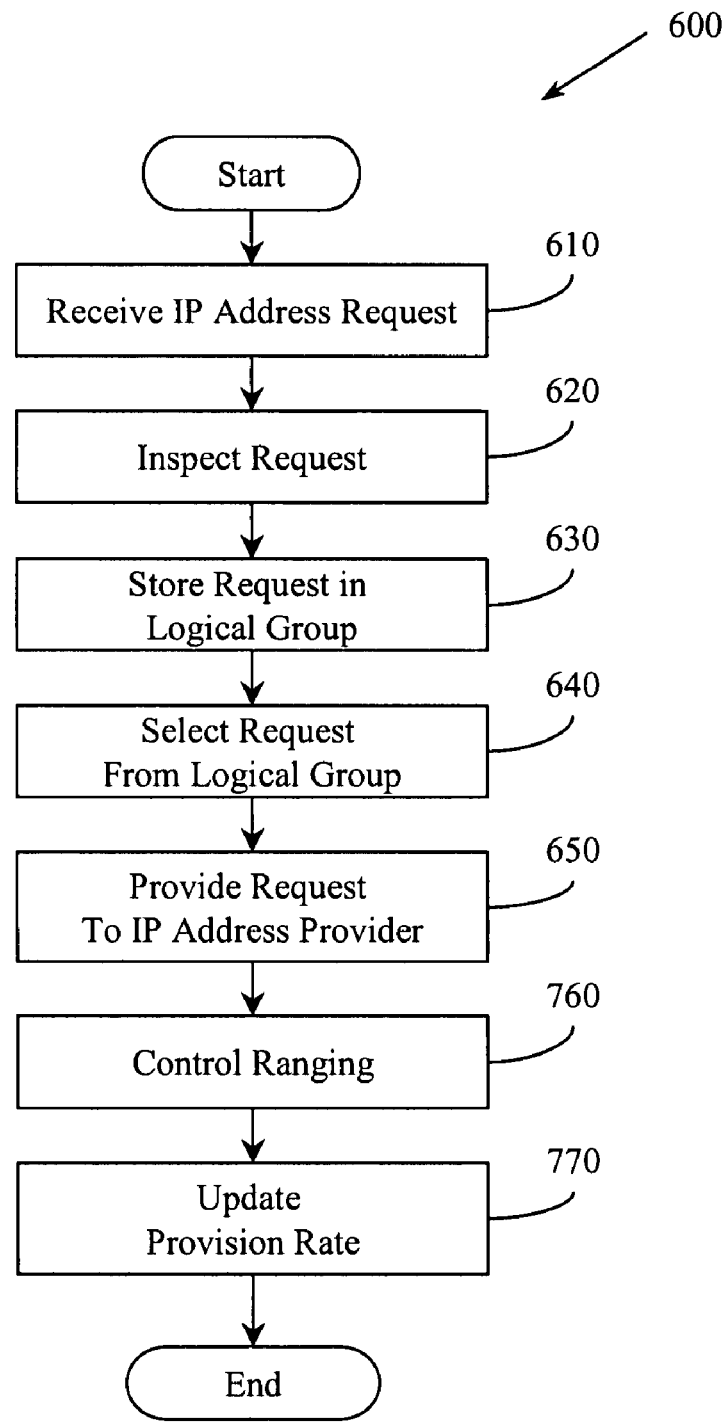
FIG. 7 illustrates an example method associated with modem prioritization and registration.

FIG. 7 illustrates another example of method 600. In some embodiments, method 600 may include, at 760, controlling ranging for a cable modem from which an IP address request has been received. For example, method 600 may hold a cable modem having a first characteristic in a non-contention ranging state by providing a ranging message to the cable modem. This may facilitate preventing the cable modem from regressing to an earlier initialization state. Controlling the ranging at 760 may also include, in one example, holding a cable modem having a second characteristic in a DHCP state for a pre-determined period of time while another cable modem(s) is held in the non-contention ranging state.

In one example, the group provision ratio employed to select requests at 640 may be user-configurable. Thus, in one embodiment, method 600 may include updating the group provision rate. Whether and how the group provision rate is updated may depend, at least in part, on a distribution of characteristics associated with cable modems that sent requests for IP addresses.

In one example, the rate at which requests are provided to an IP address provider (e.g., DHCP server) may also be updateable. Therefore, in one embodiment, method 600 may also include determining a rate at which the IP address provider responds to IP address requests and, at 770, updating the rate at which requests are provided to the IP address provider. The update may be based, at least in part, on the determined rate at which the IP address provider responds to IP address requests.

In one example, a method may be implemented as executable instructions. Thus, in one example, a tangible medium may store executable instructions that if executed by a machine (e.g., processor) cause the machine to perform method 600. The tangible medium may be a medium that participates in directly or indirectly providing signals, instructions and/or data that can be read by a machine (e.g., computer). A tangible medium may take forms, including, but not limited to, non-volatile media (e.g., optical disk, magnetic disk), and volatile media (e.g., semiconductor memory, dynamic memory). Common forms of a tangible medium include floppy disks, hard disks, magnetic tapes, RAM (Random Access Memory), ROM (Read Only Memory), CD-ROM (Compact Disk ROM), ASIC (application specific integrated circuit), and so on.

To the extent that the term "or" is employed in the detailed description or claims (e.g., A or B) it is intended to mean "A or B or both". The term "and/or" is used in the same manner, meaning "A or B or both". When the applicants intend to indicate "only A or only B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 3005).

What is claimed is:

1. An apparatus, comprising:
  a computer processor;
  a prioritizer to prioritize Dynamic Host Configuration Protocol (DHCP) requests received from a set of cable modems, the prioritizer being configured to:
    parse a DHCP request to identify a cable modem characteristic in the DHCP request; and
    assign a priority to the DHCP request based, at least in part, on the cable modem characteristic;
  a plurality of prioritized queues to store DHCP requests, and wherein the DHCP request is assigned to a particular prioritized queue based on the assigned priority for the DHCP request; and
  a flow control logic to control, by operation of the computer processor, an order in which DHCP requests are provided to a DHCP server, where the order is controlled by a priority schedule specifying an order for transmitting DHCP requests from each of the prioritized queues to the DHCP server based on a respective priority value for each of the plurality of prioritized queues.

2. The apparatus of claim 1, wherein the plurality of prioritized queues further comprises:
  a first queue to store DHCP requests having a first priority; and
  a second queue to store DHCP requests having a second priority, the first priority being greater than the second priority, and
  where the flow control logic is to provide DHCP requests from the first queue and the second queue in an order controlled by the priority schedule.

3. The apparatus of claim 2, the first priority being associated with cable modems supporting voice communications, the second priority being associated with cable modems supporting data-only communications.

4. The apparatus of claim 2, where the priority schedule is to control the flow control logic to provide a DHCP request from the second queue upon determining that the first queue is empty.

5. The apparatus of claim 2, where the priority schedule is to control the flow control logic to provide M DHCP requests from the second queue for each N DHCP requests provided from the first queue, M and N being user-configurable, dynamically updateable numbers.

6. The apparatus of claim 2, where the prioritizer is to dynamically update the size of the first queue or the second queue based on a ratio of DHCP requests received from cable modems having the first priority and DHCP requests received from cable modems having the second priority.

7. The apparatus of claim 2, where the flow control logic is to control the rate at which DHCP requests stored in the data store are to be provided to the DHCP server, where the rate is based, at least in part, on a DHCP request processing time associated with the DHCP server.

8. The apparatus of claim 7, where the flow control logic is to manipulate the rate at which DHCP requests stored in the data store are to be provided to the DHCP server.

9. The apparatus of claim 2, where the prioritizer is to dynamically update the priority schedule based on a ratio of DHCP requests received from cable modems having the first priority and DHCP requests received from cable modems having the second priority.

10. The apparatus of claim 2, comprising:
a ranging control logic to hold cable modems in a non-contention ranging state by providing ranging messages to the cable modems, where the cable modems are associated with data stored in either the first queue or the second queue, and to hold a cable modem associated with a DHCP request provided from the first in a DHCP state for a pre-defined period of time.

11. The apparatus of claim 10, the apparatus being incorporated into a cable modem termination system (CMTS) apparatus.

12. The apparatus of claim 1, where the DHCP request is a DHCP discover request and the prioritizer is to examine a value in the DHCP discover request to determine the priority of a cable modem from which the DHCP discover request is received.

13. Logic encoded in one or more non-transitory media and configured to, when executed, perform an operation comprising:
prioritizing Dynamic Host Configuration Protocol (DHCP) requests received from a set of cable modems, comprising:
parsing each DHCP request to determine a cable modem characteristic in the DHCP request;
assigning a priority to the DHCP request based, at least in part, on the cable modem characteristic;
storing the DHCP requests in one of a plurality of prioritized queues based, at least in part, on the assigned priority for each of the DHCP requests;
controlling an order in which DHCP requests are provided to a DHCP server using a priority schedule, wherein the priority schedule specifies an order for transmitting DHCP requests from each of the prioritized queues to the DHCP server based on a respective priority value of each of the plurality of prioritized queues.

14. The logic of claim 13, the operation further comprising: updating the priority schedule based on a group provision ratio, wherein the group provision ratio describes how frequently requests are stored in each of the prioritized queues relative to the other prioritized queues in the plurality of prioritized queues.

15. The logic of claim 14, the group provision ratio being dynamically configurable based, at least in part, on a distribution of characteristics associated with set of cable modems from which DHCP requests are received.

16. The logic of claim 14, the operation further comprising determining a rate at which the IP address provider responds to IP address requests, and where the group provision ratio is dynamically configurable based, at least in part, on the rate at which the IP address provider responds to IP address requests.

17. The logic of claim 13, the operation further comprising holding a cable modem having a first characteristic in a non-contention ranging state by providing a ranging message to the cable modem having the first characteristic.

18. The logic of claim 17, the operation further comprising holding a cable modem having a second characteristic in a DHCP state for a pre-determined period of time.

19. The logic of claim 13, the logic being incorporated in a cable modem termination system apparatus.

20. A method, comprising:
determining a priority of a cable modem from which a Dynamic Host Configuration Protocol (DHCP) discover request is received;
storing a set of received DHCP discover requests, the set to be organized by priority, wherein the set of received DHCP discover requests are stored in a plurality of prioritized queues, and wherein the DHCP request is assigned to a particular prioritized queue based on the determined priority for the cable modem from which the DHCP request is received; and
controlling, by operation of one or more computer processor, an order in which and a rate at which requests from the set of stored DHCP discover requests are provided to a DHCP server based, at least in part, on a priority value of the respective prioritized queue in which each of the DHCP requests are stored.

* * * * *